United States Patent [19]
Laier et al.

[11] Patent Number: 4,947,791
[45] Date of Patent: Aug. 14, 1990

[54] ARTIFICIAL REEF SYSTEM

[76] Inventors: James E. Laier, 2620 Wagon Wheel Dr., Mobile, Ala. 36609; Joe W. Ruffer, 5406 Spring Dr.; William H. Brenner, 6020 Oak Harbor Ct., both of Mobile, Ala. 36693

[21] Appl. No.: 351,245

[22] Filed: May 12, 1989

Related U.S. Application Data

[63] Continuation-in-part of Ser. No. 234,438, Aug. 19, 1988, abandoned.

[51] Int. Cl.⁵ ............................................. A01K 61/00
[52] U.S. Cl. ........................................ 119/3; 405/26; 405/32
[58] Field of Search ...................... 405/21–26, 405/32; 119/3, 4

[56] References Cited

U.S. PATENT DOCUMENTS

| | | | |
|---|---|---|---|
| 3,188,813 | 6/1965 | Foster et al. | 405/27 |
| 3,824,956 | 7/1974 | Presley | 119/3 |
| 3,898,958 | 8/1975 | Pranis, Jr. | 119/4 X |
| 4,236,280 | 12/1980 | Kreiseder | 24/16 PB |
| 4,388,019 | 6/1983 | Kajihara | 405/32 |
| 4,439,059 | 3/1984 | Kikuzawa et al. | 405/25 |
| 4,465,399 | 8/1984 | Kikuzawa et al. | 405/25 X |
| 4,704,990 | 11/1987 | Moxham | 119/4 |

FOREIGN PATENT DOCUMENTS

| | | | |
|---|---|---|---|
| 2468304 | 5/1981 | France | 119/3 |
| 1163173 | 9/1969 | United Kingdom | 405/26 |

*Primary Examiner*—Randolph A. Reese
*Assistant Examiner*—Arlen L. Olsen
*Attorney, Agent, or Firm*—Caesar, Rivise, Bernstein, Cohen & Pokotilow, Ltd.

[57] ABSTRACT

An artificial reef for marine life consisting of a system of flexible, buoyant geometric bodies. The bodies are each walled members formed of a plastics material and having a large plurality of holes or openings therein. Each of the bodies is buoyant and is anchored on the sea floor via respective variable length cable so that the bodies float within the water at various elevations. The bodies may be formed of the same size and shape or different sizes and shapes, with the openings therein also being of the same shape or different shapes and sizes. In certain embodiments the bodies are telescoped within each other, and in other embodiments the bodies are interconnected together in a manner such that their axes are in a nonparallel relationship to each other.

18 Claims, 2 Drawing Sheets

ARTIFICIAL REEF SYSTEM

RELATED APPLICATIONS

This application is a continuation-in-part of copending application Ser. No. 07/234,438, now abandoned entitled Artificial Reef System and bearing a filing date of Aug. 19, 1988.

FIELD OF THE INVENTION

This invention relates generally to a technique for forming artificial reefs suitable for habitation of marine life.

BACKGROUND ART

Various systems and techniques have been suggested in the patent literature for forming artificial reefs suitable for habitation of marine life. Examples of such prior art systems and techniques are found in U.S. Pat. Nos. 4,465,399 (Akasaka), 4,439,059 (Akasaka), 4,388,019 (Kajihara), and 3,898,958 (Pranis). All of such systems are somewhat complex in construction and appear to be limited in their placement within the water, e.g., they are arranged to be located or disposed on the sea bed or the sea floor.

Other artificial reefs are disclosed in a publication entitled "ARTIFICIAL REEFS Marine and Freshwater Applications", which was published by Lewis Publications, Inc. Floating fish attractors are specifically disclosed on pages 73 through 76. Although the floating fish attractors disclosed in the aforementioned publication may be satisfactory for certain applications, they are not specifically designed to protect small fish from larger predators, and are not optimally designed for attracting fish in the event that, over time, accumulated marine growths or other materials cause them to lose their buoyancy to the point where they sink to a position on or just above the seabed.

The formation of artificial reefs utilizing less structured techniques and systems has also been accomplished heretofore. In this regard artificial reefs have been formed by dumping various types of refuse and debris, such as automobile bodies, refrigerators, tires, concrete blocks, etc. into the sea so that they are scattered on the sea floor in the hopes of attracting marine life. Such typical reef components frequently contain metal or corrodible materials which may decay rapidly in the water and in some cases may result in its pollution or damage to the marine environment.

A number of structures employed to dampen waves are also disclosed in the prior art, as is exemplified in U.S. Pat. Nos. 3,188,813 (Foster et al.) and 3,122,632 (Parks), and in British Specification No. 1,163,173 (Bruce). The structures disclosed in these latter patents are not specifically designed to attract and/or protect fish in the manner of the artificial reef constructions forming the subject matter of the present invention.

OBJECT OF THE INVENTION

Accordingly, it is a general object of the instant invention to provide an artificial reef system which overcomes the disadvantages of the prior art.

It is a further object of this invention to provide an artificial reef system which is simple in construction and low in costs.

It is a further object of this invention to provide an artificial reef system which is light in weight and which can be transported in an unerected flat configuration.

It is a further object of this invention to provide an artificial reef system which can be readily constructed at the site and then disposed within a body of water in various configurations.

It is a further object of this invention to provide an artificial reef system in which small fish are protected from larger predators.

It is a further object of this invention to provide an artificial reef system which, even if it sinks to the bottom, provides an effective attraction for fish.

It is still a further object of this invention to provide an artificial reef which does not pose any pollution threat to the marine environment.

SUMMARY OR THE INVENTION

An artificial reef for location in a body of water comprising a walled enclosure and anchoring means therefore. The enclosure is buoyant and includes a wall portion having a large plurality of openings therein. The enclosure is anchored by the anchoring means so that it floats below the surface of the body of water, and preferably below the surface region whereat wave propogation takes place (i.e., below the region where wave-damping structures generally are employed).

In one preferred embodiment of the reef plural walled enclosures are located adjacent one another. Each of the enclosures is anchored below the surface by respective anchoring means, with the enclosures being of the same or different sizes and being located at different elevations within the body of water.

In another preferred embodiment of the reef one walled enclosure is telescoped within another of said walled enclosures, with the wall portions of the telescoped enclosures having a large plurality of openings therein to enable fish to swim therethrough. Most preferably the openings in the walled portion of the inner enclosure have a smaller area than the openings in the wall portion of the outer enclosure, to permit smaller fish to enter the inner enclosure while preventing larger predators from passing into said inner enclosure through the peripheral wall thereof.

In a further preferred embodiment of the reef at least three, elongate walled enclosures each having a central axis and a wall portion with a large plurality of openings therein, said openings being sufficiently large to enable fish to swim therethrough. A wall portion of each of said at least three elongate walled enclosures being connected to a wall portion of another of said at least three elongate walled enclosures with the central elongate axes of said at least three elongated walled enclosures being in non-parallel relationship to each other.

DESCRIPTION OF THE DRAWINGS

Other objects and many attendant features of this invention will become readily appreciated as the same becomes better understood by reference to the following detailed description when considered in connection with the accompany drawings wherein.

DETAILED DESCRIPTION OF THE PREFERRED EMBODIMENT

Figure 1:
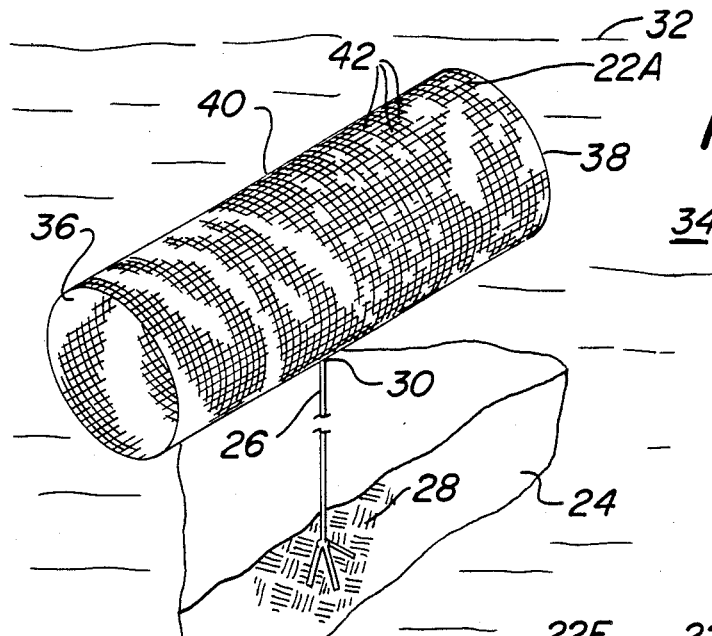
FIG. 1 is a perspective view of one portion of a typical artificial reef system of the subject invention and shown anchored on the sea floor.
Figure 2:
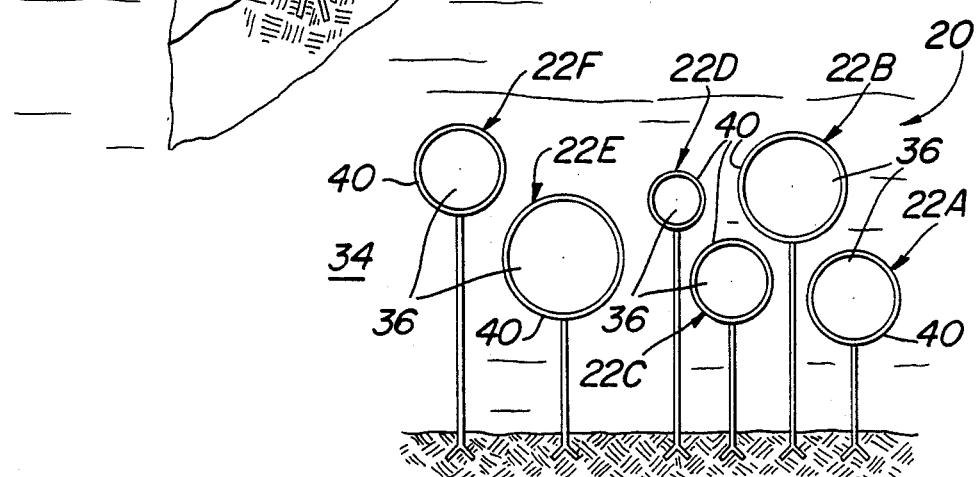
FIG. 2 is a front elevational view of a plurality of bodies like that shown in FIG. 1 but of various sizes and anchored at various elevations within the water.

Referring now in greater detail to the various figures of the drawings wherein like reference characters refer to like parts, there is shown at 20 in FIG. 2 an artificial reef system constructed in accordance with the subject invention. That system includes a plurality of bodies 22A, 22B, 22C, 22D, 22E and 22F. Each body is of generally similar construction except for its size and disposition within the body of water. It should be pointed out at this juncture that as will be described hereinafter the bodies can all be of any other geometric shape than the cylinders shown in FIG. 1, or all can be of the same shape, but different than the cylinders shown in FIG. 1. Moreover the sizes of the individual bodies of the system 20 may be the same or different, as desired. Thus, the various sized cylindrical bodies 22 of system 20 shown herein are merely exemplary.

Figure 3:
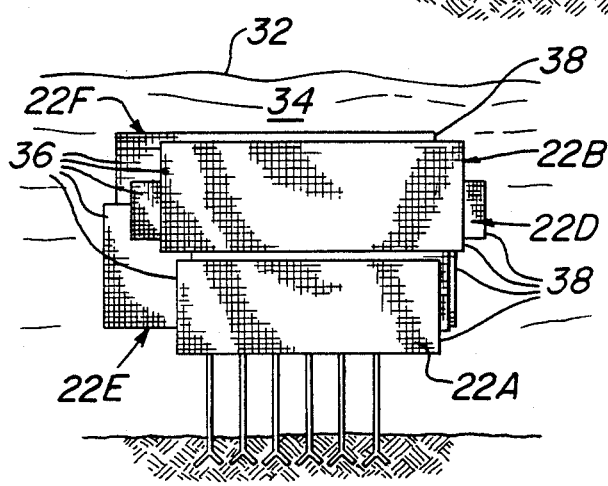
FIG. 3 is a side elevational view of the system shown in FIG. 2.

As can be seen in FIGS. 1-3 each of the bodies 22A-22F is anchored to the seabed 24 via a respective cable 26 connected at approximately the middle of each body. The cable 26 may be attached to the bodies 22A-22F at any other position, e.g., an end (so that the body will be oriented vertically) depending on the reef shape desired and/or the particular ecological surroundings. In any case the lower end of the cable 26 includes any suitable anchoring means 28 for disposition within the sand or other material making up the seabed 24. The upper end of the cable 26 is designated by the reference numeral 30 and is fixedly secured to a portion of the sidewall of the associated body 22A-22F is disposed a desired elevation above the seabed, yet under the surface 32 of the water 34.

In the exemplary embodiment shown herein the bodies 22A-22F each comprise a right circular cylinder having a pair of ends 36 and 38. The sidewall 40 of the cylinder is formed of any suitable buoyant, yet non-corrosive, non-polluting material, such as the plastic polyethylene. Other inert, non-corrosive, non-polluting plastics or other buoyant, inert, non-corrosive, non-polluting materials can be utilized.

As can be seen in FIGS. 1 and 3 the sidewall 40 of each body, being of a mesh-like construction, includes a plurality of openings 42 therein (See FIG. 1). The shape of the openings 42 may be selected as desired, e.g., rectangular, square, round, triangular, rhomboidal, irregular, etc. Moreover, the size of the openings can be selected as desired, depending on the type of marine life expected. Further still, the openings in any given sidewall may be of various sizes and/or shapes, again depending on the marine environment in which the body 22 is to be located.

It should also be pointed out at this juncture that while the sidewall 40 of each body 22A-22F is shown as being a continuous mesh, that is, having openings 42 over its entire surface area, there may be areas of the sidewall 40 which are impervious or unapertured. In the embodiment shown herein the ends 36 and 38 are shown as being open. In an alternative embodiment, one or both ends may be walled, e.g., constructed of the same or different material as that forming the sidewall 40.

In the interest of protecting the environment the cable 26 and the anchor 28 are also preferably formed of an inert, non-corrosive, non-polluting e.g., plastic material. Moreover, the cable is flexible, as is the fabric or mesh forming the body 22, so that when the body is anchored to the seabed and is floating under the water's surface it is able to move with the water current(s) or movement. Moreover the material making up the body 22 is itself sufficiently flexible so that portions of its walls can move with respect to one another. The movement of the body with respect to the seabed and the movement of the portions of the walls with respect to one another with changing currents or water movement creates an environment that is quite attractive to marine life.

As can be seen in FIGS. 2 and 3 in the exemplary system 20 the bodies 22A-22F are located in a somewhat serpentine arrangement, e.g., they are located beside one another with their longitudinal axes parallel but at various elevations. Moreover, the size of the various bodies can be the same or different (e.g., some bodies being longer than others and some bodies having a larger diameter than others as shown in the drawings herein). This feature further enhances the environment attractiveness of the system to marine life.

In another preferred embodiment of this invention one or more of the bodies 22A-22F may also be located within another body, and may be disposed concentrically or non-concentrically with the same or different apertures to allow for maximum versatility (e.g., an inner body may have smaller size openings than the outer body in which it is located to provide a haven for small fish).

Figure 4:
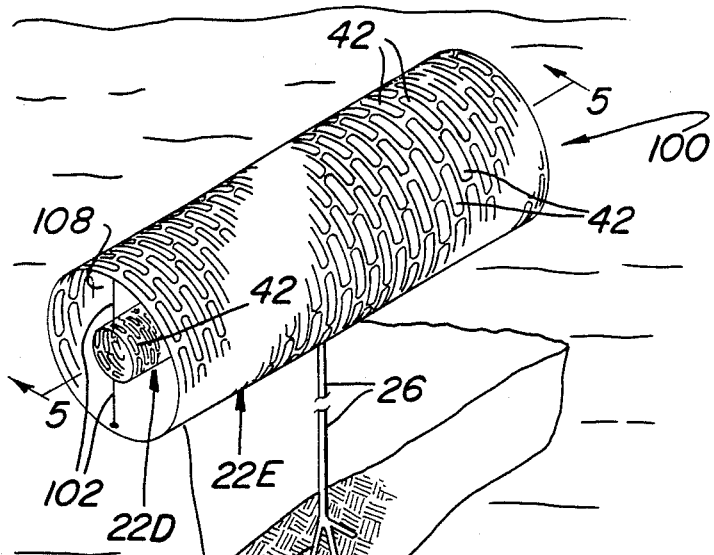
FIG. 4 is an isometric view of another embodiment of this invention.
Figure 5:
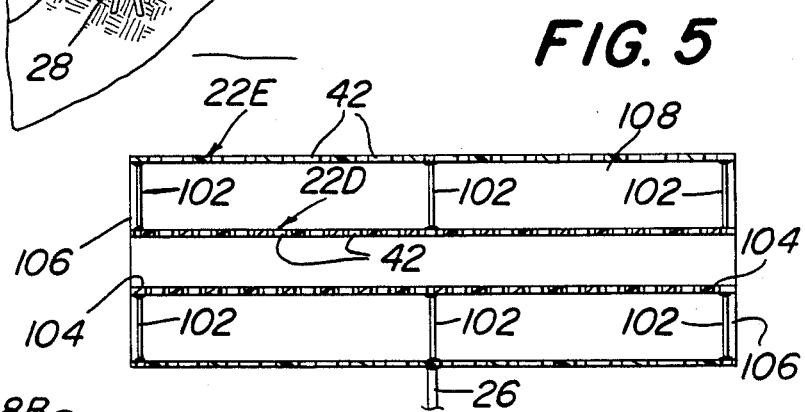
FIG. 5 is a sectional view taken along line 5—5 of FIG. 4.

Referring specifically to FIGS. 4 and 5 a preferred system 100 includes body 22D disposed generally concentrically within body 22E. These bodies can be made of the various plastic materials described earlier, and can be formed of other geometric configurations, other than the cylindrical configuration illustrated herein.

The telescoped bodies 22D and 22E are interconnected through a series of flexible, plastic ties 102, which are secured by welding to plastic membranes between the openings 42 in the outer and inner bodies 22E and 22D, respectively. If desired, the plastic ties can be connected to the bodies 22D and 22E, in a variety of different ways. For example each tie can be threaded through openings 42 and twisted upon itself to mechanically interconnect the bodies 22D and 22E to each other. These flexible ties, in the preferred embodiment, do permit some relative motion between the inner and outer bodies 22D and 22E. As is illustrated, the telescoped interconnected bodies 22D and 22E are connected through the same anchoring means 28 and cable 26 as was described earlier in connection with the embodiments illustrated in FIGS. 1-3.

As can be seen best in FIG. 4 the openings 42 in the outer body 22E have a larger open area than the openings 42 in the inner body 22D. As a result of this arrangement certain large predator fish which can enter the outer body 22E through the openings 42 therein are not able to enter the inner body 22D through the smaller openings 42 in the peripheral wall thereof. Thus, smaller fish which can enter the inner body 22D through the openings 42 in the peripheral wall thereof, are protected from attack by larger predator fish.

In some cases it may be necessary to cap the axial ends 104 of the inner body 22D with either a non-porous or a fine mesh material (not shown), to preclude predator fish from entering the interior of the inner body 22D through the axial ends thereof. In other words, small fish in the interior of the inner body 22D will not be effectively protected if the same predator fish which are precluded from entering the interior of the inner body 22D through the openings 42 in the peripheral wall thereof are permitted to enter the interior of the inner body through the axial ends 104 thereof.

It should be noted that large predator fish are permitted to enter the interior of the outer body 22E through openings 42 in the peripheral wall thereof and/or through the axial ends 106 of the annular space 108 between the bodies 22D and 22E. If the predator fish are so large that they can only enter the annular space 108 through the axial ends 106 thereof (and not through the openings 42 in the peripheral wall of the body 22E) then it may not be necessary to cap the axial ends 104 of the inner body 22D. However, what is necessary is to construct the inner body 22D so that the open area at each of the axial ends 104 is too small to permit predator fish to enter.

Figure 6:
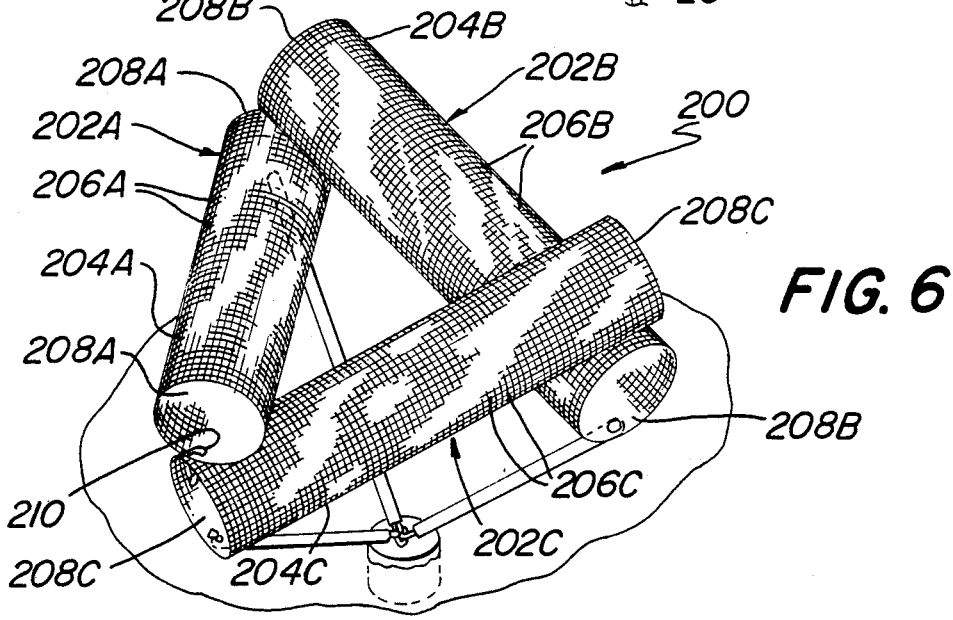
FIG. 6 is an isometric view of still another embodiment of this invention.

Referring to FIG. 6 an additional preferred embodiment of this invention is illustrated at 200. In accordance with this embodiment three, elongate walled enclosures or bodies 202A, 202B, and 202C are interconnected in a unique manner to provide an effective artificial reef, even if the system 200 sinks to a position on or just above the seabed 24, due to the accumulation of marine growth or other materials over time, which may cause the system to loose its inherent buoyancy.

Each of the bodies 202A, 202B and 202C can be identical to the bodies 22A-22F discussed earlier. In particular, these bodies have a large plurality of apertures 206A, 206B and 206C through the outer peripheral wall 204A, 204B and 204C thereof to enable fish to swim therethrough, and preferably are made from a buoyant plastic material, such as the one sold under the trademark TENSAR SR-1 GEOGRID by the Tensar Corporation located at 1210 Citizens Parkway, Morrow, Georgia 30260. In the illustrated embodiment opposed axial ends 208A, 208B and 208C of respective bodies 202A, 202B and 202C are unobstructed, and therefore permit fish to enter therethrough.

In the preferred embodiment 200 of this invention peripheral wall portions adjacent the axial ends of each of the bodies 202A, 202B and 202C are connected to a wall portion of another of said bodies adjacent the axial end thereof. In the illustrated embodiment the peripheral wall 204A of the body 202A, in the region of each of the axial ends 208A, is interconnected respectively to the peripheral wall 204C of the body 202C, in the region of one of the axial ends 208C thereof, and to the peripheral wall 204B of the body 202B, in the region of one of the axial ends 208B thereof. In the preferred embodiment the interconnection is made with conventional flexible plastic ties 210, of the type commonly employed to seal the openings of conventional garbage and trash bags. Most preferably the conventional plastic ties employ a ratchet type arrangement of the general type disclosed in U.S. Pat. Nos. 3,900,923; 4,236,280; 4,631,782 and 4,688,302, to provide a desired tight interconnection. The disclosures of these latter patents are hereby incorporated by reference herein.

Still referring to FIG. 6, in the illustrated embodiment the peripheral wall 204C of the body 202C at the axial end 208C opposite the axial end connected to the body 202A is interconnected to the peripheral wall 204B of the body 202B at the axial end 208B opposite the axial end 208B connected to the body 202A. These latter interconnections are made with the same flexible plastic ties as disclosed above, and in exactly the same manner in which the body 202A is interconnected to the bodies 202C and 202B.

As a result of the above interconnected arrangement it should be apparent that the central elongate axes of the three bodies 202A, 202B and 202C are in a non-parallel relationship to each other. In fact, in the preferred embodiment of this invention the central elongate axis of each of the bodies 202A, 202B and 202C does not lie in the same plane as the axis of any other of said bodies.

The arrangement of bodies 202A, 202B, and 202C in the system 200 provides a large, three dimensional construction which, even if it sinks to a position on or just above the seabed 24, will still present substantial structure above the seabed to function as an effective artificial reef.

The system 200 can be varied in a number of respects. First, it is not necessary to limit the construction to only the use of right cylinders. Other three-dimensional configurations can be employed. In addition, the system 200 can be formed by more than three interconnected bodies to form a large threedimensional construction. Moreover, each of the bodies employed in the system 200 can be replaced by a telescoping arrangement of bodies of the type illustrated in FIGS. 4 and 5, to thereby achieve both the benefits of the system 100 and of the system 200, in a single construction.

As will be appreciated from the foregoing the artificial reef system of the subject invention offers several advantages over prior art systems. In this regard this system offers economy since it is relatively inexpensive compared to other prior art systems. Moreover, the system is environmentally safe, the polyethylene (or other inert plastic components) of the reef is environmentally safe so that there is no danger of corrosion or water contamination. The floating geometric shapes create an attractive haven for fish or other marine life in that small fish or marine life can dart through the holes in the mesh and remain safe from larger fish or marine life. The fact that the system includes bodies which while anchored on the seabed, nevertheless float at various elevations enables those bodies to oscillate to create an environment attractive to fish. Finally, the system offers great flexibility in that it can be used adjacent to wet lands and marshes or in deep water to create a haven for private or commercial fishermen or to serve as a non-hazardous fish migration pool.

Without further elaboration, the foregoing will so fully illustrate my invention that others may, by applying future knowledge, adopt the same for use under various conditions of service.

What is claimed as the invention is:

1. An artificial reef for location in a body of water to form a haven for marine life and into and out of which fish can swim, said reef comprising a plurality of walled enclosures, anchoring means for maintaining at least two of said walled enclosures at different elevations within said body of water and for permitting said at least two of said walled enclosures to move independently with respect to each other, each of said enclosures being buoyant and including an interior volume defined by a wall portion in the form of a plastic mesh fabric having a large plurality of openings therein, each of said openings being uninterrupted by any impervious member or surface and being sufficiently large to enable fish to swim therethrough into and from said interior volume, each of said enclosures being anchored by said anchoring means so that it floats completely below the surface of said body of water below a surface region whereat wave propagation takes place.

2. The artificial reef of claim 1 wherein said walled enclosure is of a predetermined geometrical shape.

3. The artificial reef of claim 1 wherein at least two of said walled enclosures are of different sizes.

4. The artificial reef of claim 1 wherein said plastic material is polyethylene.

5. The artificial reef of claim 1 wherein said enclosures are anchored in a serpentine fashion within said body of water.

6. An artificial reef for location in a body of water to form a haven for marine life and into and out of which fish can swim, said reef comprising a plurality of walled enclosures, at least two of said walled enclosures being located at different elevations within said body of water and anchoring means therefore, each of said enclosures being buoyant and including a wall portion in the form of a plastic mesh fabric having a large plurality of openings therein, said openings being sufficiently large to enable fish to swim therethrough, each of said enclosures being anchored by said anchoring means so that it floats completely below the surface of said body of water, wherein at least one of the walled enclosures is located within another of said walled enclosures interconnecting means secured to the wall portions of the said at least one of the walled enclosures and said another of said walled enclosures for providing a space for marine life between said at least one of the walled enclosures and said another of said walled enclosures, said at least one of the walled enclosures providing an interior volume into which and out of which fish can swim.

7. The artificial reef of claim 6, wherein said at least one of the walled enclosures located within said another of said walled enclosures has smaller size openings through the wall portion thereof than through the wall portion of said another of said walled enclosures.

8. The artificial reef of claim 6, wherein at least one of the walled enclosures located within another of said walled enclosures is disposed non-concentrically within said another of said walled enclosures.

9. An artificial reef for location in a body of water to form a haven for marine life and into and out of which fish can swim, said reef comprising a plurality of walled enclosures, at least one of the walled enclosures being located within another of said walled enclosures, said at least one of the walled enclosures and said another of said walled enclosures each including a wall portion having a large plurality of openings therein, said openings being sufficiently large to enable fish to swim therethrough, interconnecting means secured to the wall portions of the said at least one of the walled enclosures and said another of said walled enclosures for providing a space for marine life between said at least one of the walled enclosures and said another of said walled enclosures, said at least one of the walled enclosures providing an interior volume into which and out of which fish can swim.

10. The artificial reef of claim 9, including anchoring means for anchoring said walled enclosures completely below the surface of said body of water below a surface region whereat wave propagation takes place.

11. The artificial reef of claim 9 wherein said at least one of the walled enclosures located within said another of said walled enclosures has smaller size openings through the wall portion thereof than through the wall portion of said another of said walled enclosures.

12. The artificial reef of claim 9, wherein said at least one of the walled enclosures located within said another of said walled enclosures is disposed non-concentrically within said another of said walled enclosures.

13. An artificial reef for location in a body of water to form a haven for marine life and into and out of which fish can swim, said reef comprising at least three, elongate walled enclosures free of a surrounding, confining material, each of said at least three elongate walled enclosures being of a three dimensional configuration and having opposed axial ends and an elongate central axis, each of said at least three elongate walled enclosures having a wall portion with a large plurality of openings therein, said openings being sufficiently large to enable fish to swim therethrough; a wall portion of each of said at least three elongate walled enclosures adjacent each axial end thereof overlying and being connected to a wall portion of another of said at least three elongate walled enclosures adjacent an axial end of said another of said at least three elongate walled enclosures with the central elongate axes thereof being in non-parallel relationship to each other.

14. The artificial reef of claim 13, wherein each of said at least three elongate walled enclosures are cylindrical in shape.

15. The artificial reef of claim 14, wherein plastic tie members connect the wall portions together.

16. The artificial reef of claim 13, wherein the opposed axial ends of each of said at least three elongate walled enclosures are free of walls.

17. The artificial reef of claim 16, wherein each of said at least three elongate walled enclosures are cylindrical in shape.

18. The artificial reef of claim 13, wherein plastic tie members connect the wall portions together.

* * * * *